United States Patent
Voigt et al.

(10) Patent No.: US 10,395,531 B2
(45) Date of Patent: Aug. 27, 2019

(54) CONTROL DEVICE AND METHOD FOR COUPLING A MULTI-STANDARD ANTENNA ASSEMBLY OF A MOTOR VEHICLE TO AT LEAST ONE VEHICLE COMPONENT

(71) Applicant: Audi AG, Ingolstadt (DE)

(72) Inventors: Christoph Voigt, Großmehring (DE); Stefan Volnhals, Adelschlag (DE); Gerald Stöckl, München (DE); Herbert Ehrentraut, Belingries (DE); Ralf Riplinger, Buxheim (DE); Aurel Papp, Karlskron (DE); Jürgen Spehl, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/084,101

(22) PCT Filed: Mar. 1, 2017

(86) PCT No.: PCT/EP2017/054783
§ 371 (c)(1),
(2) Date: Sep. 11, 2018

(87) PCT Pub. No.: WO2017/153225
PCT Pub. Date: Sep. 14, 2017

(65) Prior Publication Data
US 2019/0088124 A1    Mar. 21, 2019

(30) Foreign Application Priority Data

Mar. 11, 2016    (DE) .................. 10 2016 002 944

(51) Int. Cl.
*G08G 1/0967* (2006.01)
*G08G 1/16* (2006.01)
(Continued)

(52) U.S. Cl.
CPC .. *G08G 1/096725* (2013.01); *G08G 1/096783* (2013.01); *G08G 1/096791* (2013.01);
(Continued)

(58) Field of Classification Search
CPC ....... G08G 1/096725; G08G 1/096783; G08G 1/096791; G08G 1/161; H04B 1/3822; H04B 7/26
(Continued)

(56) References Cited

U.S. PATENT DOCUMENTS 8,280,583 B2 * 10/2012 Stahlin ................ H04L 67/12
180/168
9,014,632 B2 * 4/2015 Peterson ............... G01S 5/0027
455/41.2
(Continued)

FOREIGN PATENT DOCUMENTS

CN    101480072 A    7/2009
DE    102008061304 A1 *    7/2009 ............. G08G 1/161
(Continued)

OTHER PUBLICATIONS

English translation of DE-102008061304-A1 from EPO (Year: 2009).*
(Continued)

*Primary Examiner* — Yazan A Soofi
(74) *Attorney, Agent, or Firm* — Sterne, Kessler, Goldstein & Fox P.L.L.C.

(57) ABSTRACT

This disclosure relates to a control device for coupling an antenna assembly of a motor vehicle to at least one vehicle component of the motor vehicle for an exchange of messages with vehicle-external objects. The control device comprises a first radio module for providing a first radio link to at least one of the objects on the basis of a first radio standard, a second radio module for providing a second
(Continued)

radio link to at least one other of the objects on the basis of a second radio standard, and a processor device for receiving some of the messages via the first radio link and some other of the messages via the second radio link. The processor device includes a synchronization unit configured to forward the received messages in a sequence determined by the time data to the at least one vehicle component.

20 Claims, 1 Drawing Sheet

(51) Int. Cl.
| | | |
|---|---|---|
| H04B 1/3822 | (2015.01) | |
| H04B 7/26 | (2006.01) | |
| H04B 1/00 | (2006.01) | |
| H04W 28/02 | (2009.01) | |
| H04L 12/707 | (2013.01) | |
| H04L 12/801 | (2013.01) | |
| H04B 1/08 | (2006.01) | |
| H04W 28/10 | (2009.01) | |

(52) U.S. Cl.
CPC ............... *G08G 1/16* (2013.01); *G08G 1/161* (2013.01); *G08G 1/164* (2013.01); *H04B 1/0053* (2013.01); *H04B 1/0067* (2013.01); *H04B 1/3822* (2013.01); *H04B 7/26* (2013.01); *H04L 45/24* (2013.01); *H04L 47/14* (2013.01); *H04L 47/34* (2013.01); *H04W 28/0236* (2013.01); *H04B 1/082* (2013.01); *H04W 28/021* (2013.01); *H04W 28/10* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 9,473,579 | B2* | 10/2016 | Serrano | ..................... H04B 7/26 |
| 2007/0253402 | A1* | 11/2007 | Noble | ..................... H04L 45/00 |
| | | | | 370/351 |
| 2008/0004070 | A1 | 1/2008 | Piipponen et al. | |
| 2010/0267379 | A1* | 10/2010 | Stahlin | ............. G08G 1/096716 |
| | | | | 455/426.1 |
| 2013/0114606 | A1* | 5/2013 | Schrum, Jr. | ........... H04L 45/023 |
| | | | | 370/395.53 |
| 2014/0302774 | A1* | 10/2014 | Burke | .................... H04H 20/57 |
| | | | | 455/3.05 |
| 2015/0065060 | A1* | 3/2015 | Stahlin | ................. B60Q 1/0017 |
| | | | | 455/73 |
| 2015/0264554 | A1* | 9/2015 | Addepalli | ............. H04W 4/046 |
| | | | | 370/328 |
| 2016/0150451 | A1* | 5/2016 | Barreto De Miranda Sargento .... | |
| | | | | H04W 36/14 |
| | | | | 370/332 |

FOREIGN PATENT DOCUMENTS

| | | |
|---|---|---|
| DE | 102008061304 A1 | 7/2009 |
| DE | 102013214946 A1 | 2/2015 |
| DE | 102014211013 A1 | 12/2015 |
| EP | 1876771 A1 | 6/2007 |

OTHER PUBLICATIONS

International Search Report and Written Opinion of the International Searching Authority directed to related International Patent Application No. PCT/EP2017/054783, dated May 12, 2017, with attached English-language translation; 26 pages.

International Preliminary Report on Patentability directed to related International Patent Application No. PCT/EP2017/054783, dated Jun. 26, 2018, with attached English-language translation; 15 pages.

* cited by examiner

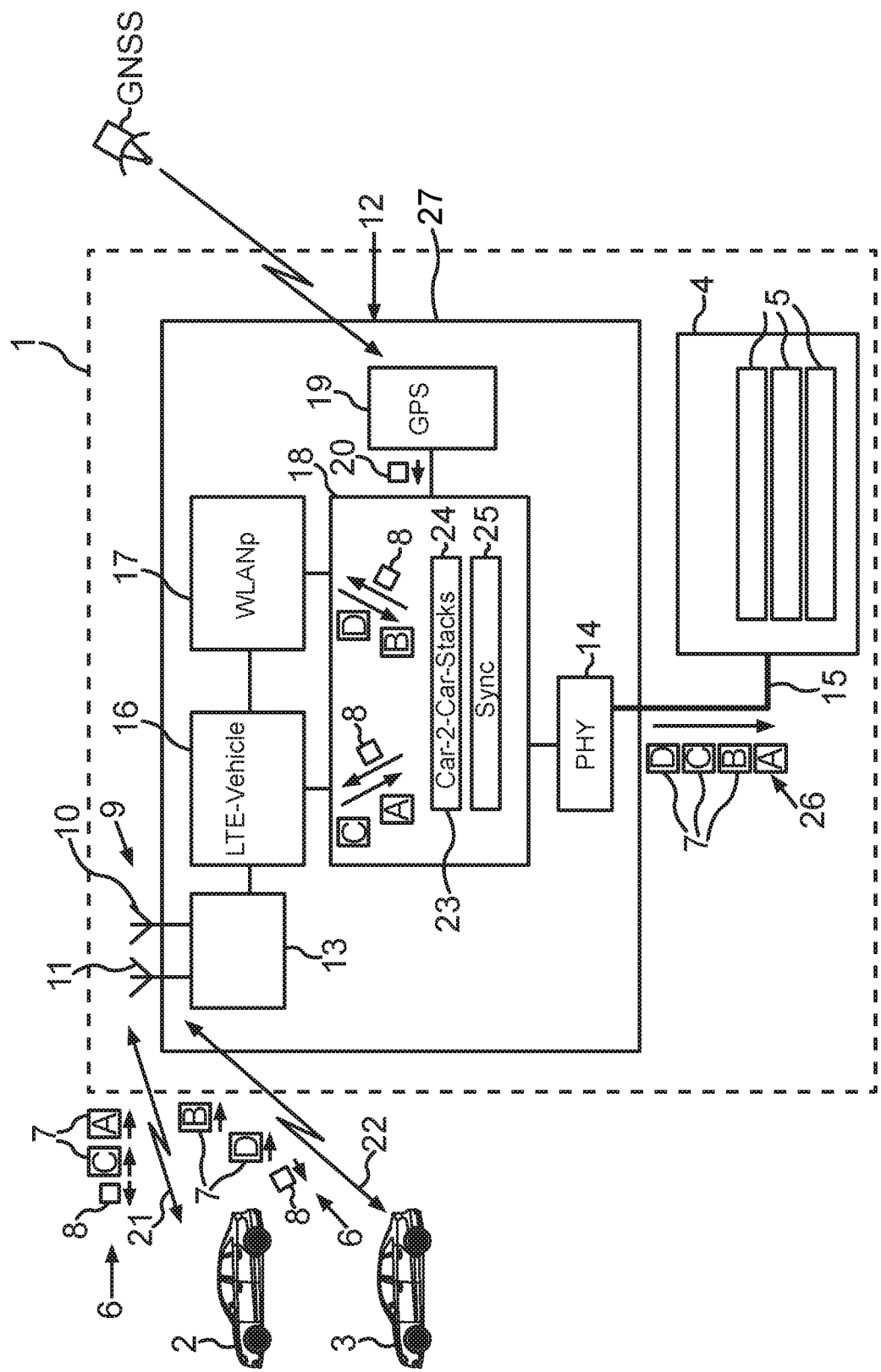

CONTROL DEVICE AND METHOD FOR COUPLING A MULTI-STANDARD ANTENNA ASSEMBLY OF A MOTOR VEHICLE TO AT LEAST ONE VEHICLE COMPONENT

TECHNICAL FIELD

This disclosure relates to a control device and a method for coupling an antenna assembly of a motor vehicle to at least one vehicle component of the motor vehicle, to exchange messages between the at least one vehicle component and vehicle-external objects. The control device includes a radio module for providing a radio link to at least one of the objects.

BACKGROUND

A driver assistance system of a motor vehicle may provide a driver assistance functionality on the basis of a message exchange with vehicle-external objects. Such a driver assistance functionality may, for example, be the execution of a self-braking of the motor vehicle and/or of a steering intervention. The vehicle-external objects may, for example, include an unknown or other vehicle or an infrastructure component, for example, a traffic light. The messages may, for example, be notifications based on the car-2-car standard (see, for example, the internet website www.car-2-car.org). The messages may, for example, describe position data and/or relative distances.

The question arises here as to which radio standard or which radio technology is to be used for exchanging the message. For this purpose, it is known to use a wireless local network (WLAN) module as a radio module based, for example, on the IEEE 802.11p Standard. However, there is also the possibility of exchanging the messages on the basis of a long term evolution (LTE) mobile radio module, which is also referred to as LTE Vehicle. Additionally or alternatively, the 5G-Car2Car Standard may also be provided.

On the whole, the problem thus arises that to provide the driver assistance functionality on the basis of messages from multiple objects, a motor vehicle must ensure that messages can be exchanged with all objects, i.e., that the different transmission technologies supported by the objects can be processed.

An additional problem is that the different transmission technologies, i.e., LTE Vehicle, WLAN or another car-2-car-suitable transmission technology, exhibit different delay times or transmission times, so that because of varying delays during the message transmission, the simultaneous coordination of the driver assistance functionality with multiple objects must be ensured.

BRIEF DESCRIPTION OF THE DRAWINGS/FIGURES

The accompanying drawing, which is incorporated herein and forms part of the specification, illustrates the present embodiments and, together with the description, further serves to explain the principles of the present embodiments and to enable a person skilled in the relevant art(s) to make and use the present embodiments.

FIG. 1 is a schematic representation of the motor vehicle, according to some embodiments.

The features and advantages of the present embodiments will become more apparent from the detailed description set forth below when taken in conjunction with the drawing, in which like reference characters identify corresponding elements throughout. In the drawing, like reference numbers generally indicate identical, functionally similar, and/or structurally similar elements.

DETAILED DESCRIPTION

The object of this disclosure is to coordinate chronologically a message exchange between at least one vehicle component and multiple vehicle-external objects, while at the same time also using different transmission technologies.

This disclosure provides a control device for coupling an antenna assembly to at least one vehicle component of a motor vehicle. The control device is provided for exchanging messages between vehicle-external objects and the at least one vehicle component. An exchange in this case means at least the receiving of messages, preferably the sending and receiving of messages.

For this purpose, the control device includes an antenna connection device for connecting the antenna assembly as well as a network connection device for coupling the control device to the at least one vehicle component. At least two radio modules are provided in the control device. A first radio module is designed to provide a first radio link to at least one of the objects, wherein the first radio link is provided on the basis of, i.e., using, a first radio standard. The second radio module is provided for providing a second radio link to at least one of the objects, wherein the second radio link is provided on the basis of a second radio standard, which differs from the first radio standard. The radio links are each provided via the antenna assembly.

A processor device of the control device is adapted to receive at least one of the aforementioned messages via the first radio link and at least one other of the messages via the second radio link. Thus, of the messages received, some can be received via the first radio link and others can be received via the second radio link.

To be able to forward the message chronologically coordinated to the at least one vehicle component, despite the different radio standards used and the accompanying different transmission times, the processor device can include a synchronization unit, adapted to ascertain respective time data for each received message. The time data may, for example, indicate a transmission time or a receiving time. The received messages can be forwarded to the at least one vehicle component in a sequence determined by the time data. Thus, the two radio modules are operated simultaneously and alternatingly receive messages via their respective radio link.

In the process, however, even such messages that are emitted simultaneously from one of the objects, respectively, do not in fact actually arrive simultaneously in the processor device. Instead, transmission delays result, which are a function of the respective radio standard. The processor device then ascertains the aforementioned time data. These data may be contained, for example, in the message. The time data may also be generated, for example, by detecting a respective time of receipt of each message in the control unit itself. The synchronization unit then relays the messages in the chronologically correct sequence to the at least one vehicle component. The sequence is determined on the basis of the time data. This ensures that a message that has been received via a more rapid radio standard does not "overtake" a message received via a slower radio standard.

Thus, advantageously, at least one vehicle component can receive the messages received from the vehicle-external objects in the correct chronological sequence regardless of the radio standard used.

The following method results from the operation of the disclosed control device. The first radio module provides the first radio link via the antenna assembly to at least one of the objects on the basis of, i.e., using, the first radio standard. At the same time, the second radio module provides a second radio link via the antenna assembly to at least one other of the objects on the basis of the second radio standard. The processor device receives at least one of the messages in the manner described via the first radio link and at least one other of the messages via the second radio link. The synchronization unit of the processor device can ascertain respective time data for each received message and can forward the received messages to the at least one vehicle component in a sequence determined by the time data.

This disclosure also includes optional refinements, the features of which result in additional advantages.

As previously stated, the chronological coordination, particularly in conjunction with the car-2-car communication, is beneficial. Accordingly, it is preferably provided that the control device can be adapted to exchange car-2-car notifications and/or car-2-X-notifications with at least one other vehicle and/or with at least one infrastructure component.

The first radio module is preferably a mobile radio module, in particular, an LTE module and/or a 5G module. The LTE module and the 5G module may each be designed to provide the first radio link according to the LTE vehicle or 5G Car2Car Standard provided for the car-2-car communication (vehicle-to-vehicle communication). In terms of the second radio module, it is preferably provided that this module is a WLAN module and/or a Bluetooth module. This involves, in particular, a WLAN module according to the IEEE 802.11p Standard, which is referred to below as WLANp. A mobile radio standard can exhibit a particularly different transmission time compared to that of a WLAN standard. Accordingly, here too, the difference in the transmission time can be compensated for or offset in an advantageous manner by the control device with the aid of the synchronization unit.

The network connection device for coupling the control device to the at least one vehicle component is preferably an Ethernet connection. In other words, the messages can be forwarded in accordance with the Ethernet standard. This results in the advantage that the sequence of the messages can also be maintained during forwarding.

To also coordinate the transmissions of messages with the vehicle-external objects, it is preferred to provide a receiver device for receiving a signal of a Global Navigations Satellite System (GNSS), in particular, the Global Positioning System (GPS). The control device in this case can be adapted to transmit some of the messages to be transmitted with time data that can be generated on the basis of the time signal. In other words, each of the messages to be transmitted may be provided or fitted with a time stamp based on the time signal.

To receive and send the messages, a protocol stack can be provided in the processor device, to also supplement the actual user data with additional transmission data for controlling the transmission. Such transmission data can be, for example, a recipient address and/or a description of the data type of the user data. In this case, it is preferably provided that the processor device is adapted to provide a respective independent protocol stack for each radio module or for each radio link. This offers the advantage that messages that arrive via one of the radio links and that have a high data rate, are not able to impair or block the receipt of messages arriving via the other radio link.

Preferably, the two radio modules and the processor device can be provided in a shared housing. This offers the advantage that the control device can be placed as a single component close to the antenna assembly.

This disclosure also includes a motor vehicle having an antenna assembly and having at least one vehicle component, which can be adapted to provide at least one driver assistance functionality on the basis of a message exchange with vehicle-external objects. The antenna assembly may comprise a single antenna or also multiple antennas. The at least one vehicle component may be designed, for example, as a driver assistance control unit. A self-braking and/or a steering intervention and/or an output of a warning signal for a driver of the motor vehicle may be provided as a driver assistance function, for example, in the event that one of the objects is closer than a minimum distance to the motor vehicle. In the motor vehicle, the antenna assembly and the at least one vehicle component can be coupled via the control device according to some embodiments. In this way, each vehicle component may exchange messages with the objects via two radio links, which are based on different radio standards.

It is preferably provided that the antenna assembly can include a roof antenna, and that the control device can be situated at a distance from the roof antenna of less than 1.5 meters, and particularly, less than 1 meter. For example, the control device can preferably be installed in the roof of the motor vehicle, for example, integrated in a roof built-in module. For this purpose, only the more robust, in terms of electromagnetic compatibility (EMC), and/or more reliable coupling between the control device and the at least one vehicle component need take place over the longer linking distance. However, the more critical coupling, in terms of EMC, of the control device with the antenna assembly, in particular, the roof antenna, may take place via a relatively shorter line, so that radiated interference can be reduced. A greater distance to an antenna may also be bridged via an amplifier in the antenna.

This disclosure also includes refinements of the method corresponding to the refinements of the motor vehicle. For this reason, the corresponding refinements of the method are not described once again here.

An exemplary embodiment is described below according to FIG. 1, which is a schematic representation of one embodiment of the disclosed motor vehicle.

The exemplary embodiment described below is a preferred embodiment. The components of the exemplary embodiment each represent features to be considered independently of one another, each of which also refine the invention independently of one another and can therefore also be considered in combinations other than that shown. In addition, the embodiment described may also be supplemented by additional features previously described.

FIG. 1 shows a motor vehicle 1, which may, for example, be an automobile, in particular, a passenger motor vehicle. In addition, vehicle-external objects 2, 3 are depicted, which each may, for example, be another vehicle or an infrastructure component such as, for example, a traffic light or a traffic sign. In the following example, vehicles are assumed for vehicle-external objects 2, 3.

The motor vehicle 1 may include a vehicle component 4, which may provide one or multiple driver assistance functionalities 5. The vehicle component 4 may, for example, be a driver assistance control unit. The driver assistance functionalities 5 may, for example, include a self-braking and/or a steering intervention and/or the output of a warning message. In such case, the driver assistance functionalities 5 can take into account the vehicle-external objects 2, 3. For this purpose, messages 6 can be exchanged between the vehicle component 4 and the vehicle-external objects 2, 3. A distinction is drawn below between received messages 7 that are received from the vehicle-external objects 2, 3 and transmitted messages 8 that are transmitted to the vehicle-external objects 2, 3.

The messages 6 may be exchanged via an antenna assembly 9 of the motor vehicle 1, which may comprise, for example, a roof antenna 10 and optionally an additional diversity/auxiliary antenna 11. The vehicle component 4 may be coupled to the antenna assembly 9 via a control device 12, which may, for example, be a single component having a housing 27. The antenna assembly 9 may be connected to the control device 12 via an antenna connection device 13, such as an antenna coupler. The antenna connection device 13 in this case may include coaxial terminals for the roof antenna 10 and diversity/auxiliary antenna 11 of the antenna assembly 9. A cross switch may also be provided for multiple antennas, for example.

The vehicle component 4 may be connected to the control device 12 via a physical (PHY) network connection device 14 of the control device 12. The network connection device 14 (PHY) may, for example, be an Ethernet connection to which an Ethernet network 15 may be connected, to which the vehicle component 4 may also be coupled. The network connection device 14 (PHY) may, in particular, be a gigabit Ethernet connection. The network connection device 14 (PHY) may include the physical connection and optionally, for example, a driver device for exchanging data with the Ethernet network 15.

A first radio module 16, a second radio module 17 and a processor device 18 may be provided in the control device 12 in order to transmit messages 6 between the antenna connection device 13 and the network connection device 14 (PHY). In addition, receiver device 19 for receiving a time signal 20 of a GNSS may be provided. The GNSS may, for example, be the GPS, i.e., the receiver device 19 may be a GPS receiver. The receiver device 19 may also merely be a terminal for connecting an external receiver for a GNSS.

The first and second radio modules 16, 17, respectively, may be designed for providing a respective first and second radio link 21, 22, each according to a different radio standard. The first radio module 16 may, for example, be a mobile radio module, for example a LTE module for a LTE vehicle radio link 21. The second radio module 17 may, for example, be a WLAN module for the WLANp Standard for providing a WLAN radio link 22.

The received messages 7 received from the vehicle-external objects 2, 3 can be transmitted at different points in time or also simultaneously from the vehicle-external objects 2, 3. In the following, it is assumed that the received messages 7 are transmitted in the chronological sequence of the vehicle-external objects 2, 3, as they are identified by the letters A, B, C, D. The time indications A, B, C, D in this case also represent time data, which may be included in the received messages 7, for example. The received messages 7 may be transferred by the respective first and second radio modules 16, 17 to a protocol stack of the processor device 18. For example, each protocol stack of the first and second protocol stacks 23, 24, respectively, may be a respective car-2-car stack for a car-2-car communication. The first and second protocol stacks 23, 24 can then output the received messages 7 in each case in the correct sequence, i.e., A, C, for the first protocol stack 23 and B, D for the second protocol stack 24. The first and second radio links 21, 22 and the processing in the first and second radio modules 16, 17 may, however, result in transmission times of varying length due to the radio standard used. For this reason, the absolute sequence of all received messages 7 may no longer be clearly apparent from this.

For this reason, a synchronization unit 25 (Sync) can be provided in the processor device 18. The synchronization unit 25 can accept the packets of the received messages 7 from the first and second protocol stacks 23, 24 and can determine, for example, on the basis of the time data A, B, C, D within the received messages 7 and transmitted messages 8 an absolute sequence 26, which corresponds to the points in time at which the received messages 7 are transmitted. The synchronization unit 25 may then forward the received messages 7 via the network connection device 14 (PHY) collectively in a chronologically correct, absolute sequence 26 to the vehicle component 4.

The first and second protocol stacks 23, 24 and the synchronization unit 25 may, for example, each be program modules of the processor device 18.

To also provide time data in the transmitted messages 8 for the vehicle-external objects 2, 3, time data that are comparable to time data of other transmitters, for example, of other vehicles, each transmitted message 8 may be supplemented with time data, for example, a time stamp by the processor device 18 on the basis of the time signal 20 when transmitting the transmitted messages 8. This may be implemented, for example, by the first and second protocol stacks 23, 24.

On the whole, therefore, a coexistence of WLANp and LTE vehicle (5G-Vehicle-Car-2-Car modem) in the control device 12 can be implemented in one control device or one control unit. These two communication devices can be chronologically synchronized by the shared application processor in the form of the processor device 18. The chronological synchronization without time delay (jitter) is possible as a result of the localization and shared use of the GPS receiver device 19 in the control device 12.

Thus, a real-time-enabled time synchronization for first and second radio links 21, 22 of different radio standards is made possible. The control device 12 may nevertheless be compactly designed and is therefore preferably situated proximate the antenna assembly 9, for example, close to the roof antenna 10. "Close," in this case, means that a distance may be less than 1.5 meters, and in particular, less than 1 meter.

With the first and second radio modules 16, 17 being operated simultaneously, and both simultaneously or alternatingly operating first and second radio links 21, 22 via the antenna assembly 9, a combined communication both with other motor vehicles, infrastructure components (road-side units), and base stations of mobile radio networks is possible.

In conjunction with the exchange of data with other motor vehicles, it is possible to ensure in parallel the car-to-car communication via different radio technologies, in particular via WLANp and mobile radio-based technology.

On the whole, the example shows how a car-2-car control unit with coexisting WLANp and LTE vehicle may be provided with the aid of a shared application processor.

The invention claimed is:

1. A control device for coupling an antenna assembly of a motor vehicle to at least one vehicle component of the motor vehicle for an exchange of messages with vehicle-external objects, comprising:

an antenna connection device for connecting the antenna assembly to the at least one vehicle component;

a first radio module for providing a first radio link via the antenna assembly to at least one of the vehicle-external objects using a first radio standard;
a network connection device (PHY) for coupling the control device to the at least one vehicle component;
a second radio module for simultaneously providing a second radio link via the antenna assembly to at least one other of the vehicle-external objects using a second radio standard differing from the first radio standard;
a processor device for receiving at least one of the messages via the first radio link and for receiving at least one other of the messages via the second radio link; and
a receiver device for receiving a time signal of a Global Navigation Satellite System (GNSS), wherein the control device is configured to transmit a portion of the messages with time data and to generate the portion of the messages based on the time signal,
wherein the processor device comprises a synchronization unit configured to:
determine respective time data for each received message of the portion of the messages, wherein the respective time data are generated in the control device through detection of a respective time of receipt of each received message, and
forward each received message in a sequence determined by the respective time data to the at least one vehicle component, and
wherein the processor device is further configured to provide a respective protocol stack for each of the first radio module and the second radio module.

2. The control device of claim 1, further configured to exchange car-2-car notifications or car-2-X notifications as the messages to at least one other vehicle or to at least one infrastructure component.

3. The control device of claim 1, wherein the first radio module is a mobile radio module, and the second radio module is a WLAN module or a Bluetooth module.

4. The control device of claim 3, wherein the mobile radio module is a LTE module or a 5G module.

5. The control device of claim 3, wherein the WLAN module uses an IEEE 802.11p standard.

6. The control device of claim 1, wherein the network connection device (PHY) is an Ethernet connection.

7. The control device of claim 1, wherein the first radio module, the second radio module, and the processor device are provided in a shared housing.

8. A motor vehicle having an antenna assembly and having at least one vehicle component, the at least one vehicle component configured to provide at least one driver assistance functionality based on an exchange of messages with vehicle-external objects, wherein the antenna assembly and the at least one vehicle component are coupled via a control device comprising:
an antenna connection device for connecting the antenna assembly to the at least one vehicle component;
a first radio module for providing a first radio link via the antenna assembly to at least one of the vehicle-external objects using a first radio standard;
a network connection device (PHY) for coupling the control device to the at least one vehicle component;
a second radio module for simultaneously providing a second radio link via the antenna assembly to at least one other of the vehicle-external objects using a second radio standard differing from the first radio standard;
a processor device for receiving at least one of the messages via the first radio link and for receiving at least one other of the messages via the second radio link; and
a receiver device for receiving a time signal of a Global Navigation Satellite System (GNSS), wherein the control device is configured to transmit a portion of the messages with time data and to generate the portion of the messages based on the time signal,
wherein the processor device comprises a synchronization unit configured to:
determine respective time data for each received message of the portion of the messages, wherein the respective time data are generated in the control device through detection of a respective time of receipt of each received message, and
forward each received message in a sequence determined by the respective time data to the at least one vehicle component, and
wherein the processor device is further configured to provide a respective protocol stack for each of the first radio module and the second radio module.

9. The motor vehicle of claim 8, wherein the control device is further configured to exchange car-2-car notifications and/or car-2-X notifications as the messages to at least one other vehicle or to at least one infrastructure component.

10. The motor vehicle of claim 8, wherein the first radio module is a mobile radio module, and the second radio module is a WLAN module or a Bluetooth module.

11. The motor vehicle of claim 8, wherein the network connection device (PHY) is an Ethernet connection.

12. The motor vehicle of claim 8, wherein the antenna assembly comprises a roof antenna and the control device is situated at a distance to the roof antenna less than 1.5 meters.

13. The motor vehicle of claim 12, wherein the distance to the roof antenna is less than one meter.

14. A method for coupling an antenna assembly of a motor vehicle to at least one vehicle component of the motor vehicle for an exchange of messages with vehicle-external objects, the method comprising:
providing, by a first radio module of the motor vehicle, a first radio link via the antenna assembly to at least one of the vehicle-external objects using a first radio standard;
communicating, by a network connection device (PHY), between a control device of the motor vehicle and the at least one vehicle component;
providing, by a second radio module of the motor vehicle, a second radio link via the antenna assembly to at least one other of the vehicle-external objects using a second radio standard that differs from the first radio standard, wherein the second radio link is provided simultaneously with the first radio link;
receiving, by a processor device of the motor vehicle, at least one of the messages via the first radio link and at least another of the messages via the second radio link;
receiving, by a receiver device of the motor vehicle, a time signal of a Global Navigation Satellite System (GNSS);
transmitting, by the control device of the motor vehicle, a portion of the messages with time data, the transmitting further comprising:
generating the time data through detection of a respective time of receipt of each received message of the portion of the messages in the control device; and
generating the time data based on the time signal;

determining, by a synchronization unit of the processor device, respective time data for each received message;

forwarding, by the synchronization unit, each received message in a sequence determined by the respective time data to the at least one vehicle component; and providing, by the processor device, a respective independent protocol stack for each of the first radio module and the second radio module.

15. The method of claim 14, further comprising exchanging, by the control device, car-2-car notifications or car-2-X notifications as the messages to at least one other vehicle or to at least one infrastructure component.

16. The method of claim 14, further comprising:
providing the first radio link by a mobile radio module serving as the first radio module; and
providing the second radio link by a WLAN module or a Bluetooth module serving as the second radio module.

17. The method of claim 16, further comprising providing the first radio link by a LTE module or a 5G module serving as the mobile radio module.

18. The method of claim 16, further comprising providing the second radio link by the WLAN module using an IEEE 802.11p standard.

19. The method of claim 14, further comprising communicating between the control device of the motor vehicle and the at least one vehicle component over an Ethernet connection.

20. The method of claim 14, further comprising receiving, by the processor device of the motor vehicle, the first radio link from the first radio module and the second radio link from the second radio module from within a common housing of the processor device, the first radio module, and the second radio module.

* * * * *